United States Patent
Mullins et al.

(10) Patent No.: US 9,652,047 B2
(45) Date of Patent: May 16, 2017

(54) VISUAL GESTURES FOR A HEAD MOUNTED DEVICE

(71) Applicant: DAQRI, LLC, Los Angeles, CA (US)

(72) Inventors: Brian Mullins, Sierra Madre, CA (US); Matthew Kammerait, West Hollywood, CA (US); Christopher Broaddus, Mountain View, CA (US); Sterling Crispin, Los Angeles, CA (US); Lucas Kazansky, Los Angeles, CA (US)

(73) Assignee: DAQRI, LLC, Los Angeles, CA (US)

( * ) Notice: Subject to any disclaimer, the term of this patent is extended or adjusted under 35 U.S.C. 154(b) by 0 days.

(21) Appl. No.: 15/052,775

(22) Filed: Feb. 24, 2016

(65) Prior Publication Data

US 2016/0246384 A1    Aug. 25, 2016

Related U.S. Application Data

(60) Provisional application No. 62/120,776, filed on Feb. 25, 2015.

(51) Int. Cl.
*G06F 3/01* (2006.01)
*G06F 3/0481* (2013.01)
*G02B 27/01* (2006.01)

(52) U.S. Cl.
CPC .......... *G06F 3/017* (2013.01); *G02B 27/017* (2013.01); *G06F 3/013* (2013.01); *G06F 3/015* (2013.01); *G06F 3/0481* (2013.01); *G02B 2027/014* (2013.01); *G02B 2027/0187* (2013.01)

(58) Field of Classification Search
CPC .......... G06F 3/011; G06F 3/013; G06F 3/017; G02B 27/017
See application file for complete search history.

(56) References Cited

U.S. PATENT DOCUMENTS

| | | | | |
|---|---|---|---|---|
| 4,109,145 A | * | 8/1978 | Graf | A61B 3/113 250/221 |
| 9,292,973 B2 | * | 3/2016 | Bar-Zeev | G02B 27/017 |
| 9,323,325 B2 | * | 4/2016 | Perez | H04N 13/0278 |
| 9,342,610 B2 | * | 5/2016 | Liu | G02B 27/017 |

(Continued)

FOREIGN PATENT DOCUMENTS

| | | |
|---|---|---|
| EP | 2698099 A1 | 2/2014 |
| GB | 2494907 A | 3/2013 |

(Continued)

OTHER PUBLICATIONS

"International Application Serial No. PCT/US2016/019418, International Search Report mailed May 11, 2016", 2 pgs.

(Continued)

*Primary Examiner* — Ricardo L Osorio
(74) *Attorney, Agent, or Firm* — Schwegman Lundberg & Woessner, P.A.

(57) ABSTRACT

Visual gestures in a display device allow a user to select and activate features in a display of the display device. A sensor of the display device tracks an eye gaze of a user directed at a display of the display device. A visual gesture module identifies a predefined trigger zone in the display. A virtual object application displays a virtual object in the display based on the eye gaze of the user and the predefined trigger zone.

18 Claims, 13 Drawing Sheets

(56) References Cited

U.S. PATENT DOCUMENTS

| | | | |
|---|---|---|---|
| 2008/0062297 A1* | 3/2008 | Sako | G02B 27/017 348/333.02 |
| 2012/0068913 A1 | 3/2012 | Bar-Zeev et al. | |
| 2013/0219012 A1 | 8/2013 | Suresh et al. | |
| 2013/0241952 A1* | 9/2013 | Richman | G06F 17/21 345/619 |
| 2014/0049452 A1 | 2/2014 | Maltz | |
| 2014/0198189 A1 | 7/2014 | Aronsson et al. | |
| 2014/0247208 A1* | 9/2014 | Henderek | G06F 3/0481 345/156 |
| 2014/0282220 A1* | 9/2014 | Wantland | G06F 3/04845 715/782 |
| 2015/0128049 A1* | 5/2015 | Block | G06F 3/14 715/728 |
| 2015/0293589 A1* | 10/2015 | Zhou | G06T 7/0085 345/157 |
| 2016/0062457 A1* | 3/2016 | Kobayashi | G06F 3/013 345/156 |
| 2016/0089980 A1* | 3/2016 | Kurahashi | G06F 3/013 345/156 |
| 2016/0209648 A1* | 7/2016 | Haddick | G02B 27/0093 345/7 |

FOREIGN PATENT DOCUMENTS

| | | |
|---|---|---|
| WO | WO-2009094643 A2 | 7/2009 |
| WO | WO-2016138178 A1 | 9/2016 |

OTHER PUBLICATIONS

"International Application Serial No. PCT/US2016/019418, Written Opinion mailed May 11, 2016", 9 pgs.

\* cited by examiner

VISUAL GESTURES FOR A HEAD MOUNTED DEVICE

REFERENCE TO RELATED APPLICATION

This application claims the benefit of priority of U.S. Provisional Application No. 62/120,776 filed Feb. 25, 2015, which is hereby incorporated by reference in its entirety.

TECHNICAL FIELD

The subject matter disclosed herein generally relates to the processing of data. Specifically, the present disclosure addresses systems and methods for visual gestures for a mobile device.

BACKGROUND

User interfaces on mobile devices with touchscreen often require the use of tapping, swiping, or otherwise to activate features in applications. Some applications on mobile devices typically require the user to interact with the touchscreen with the user's fingers or stylus to provide input to the applications. When viewing content on a mobile device while holding the mobile device with both hands such as when taking a picture, the user is required to remove one hand from the mobile device to activate a command such as by tapping a shutter button on an application.

BRIEF DESCRIPTION OF THE DRAWINGS

Some embodiments are illustrated by way of example and not limitation in the figures of the accompanying drawings.

DETAILED DESCRIPTION

Figure 1:
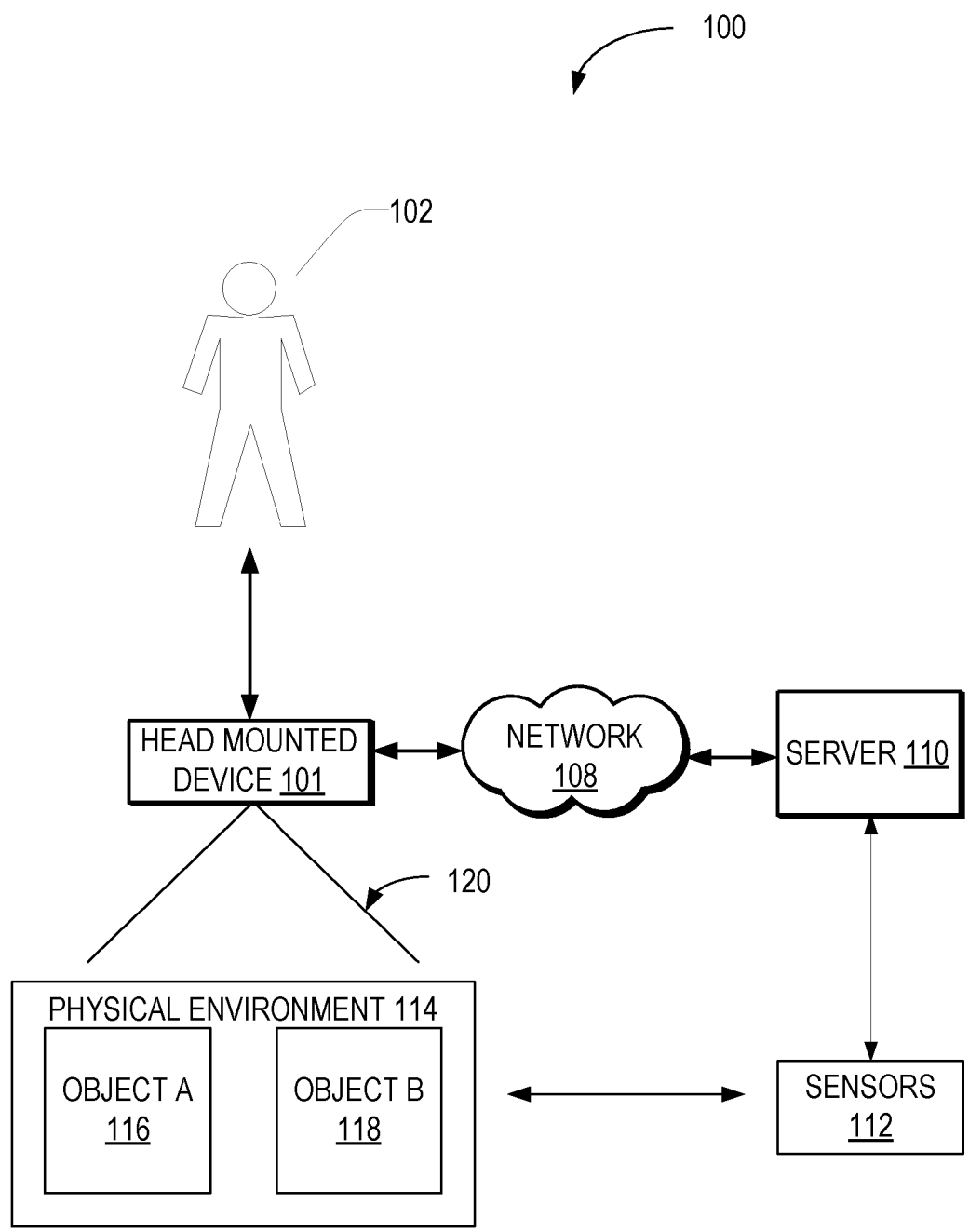
FIG. 1 is a block diagram illustrating an example of a network suitable for a head mounted device (HMD) system, according to some example embodiments.

Example methods and systems are directed to detecting visual gestures from a mobile device. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

"Visual gestures" in a display device allow a user to select and activate features related to virtual content displayed in the display device without the user having to move his hands or fingers (e.g., tap on a touch sensitive surface of the device). The mobile device can be a wearable device such as eyeglasses, a helmet, a visor, or any other head mounted device (HMD). For example, the user makes a "visual gesture" by looking at virtual or physical devices through a display lens of a head mounted device (HMD). The HMD includes an augmented reality (AR) application that tracks an eye gaze of the user. The eye gaze may refer to a user line of sight of the user based on a position and orientation of the eyes of the user relative to the display lens. The orientation and position of the eye of the user may be detected using sensors in the HMD. The AR application determines the eye gaze of the user based on detected orientation and position of the eyes of the user. Predefined functions (e.g., user inputs) can be associated with the eye gaze of the user relative to the display lens and the virtual content displayed in the display lens. Therefore, the user can perform visual gestures by looking at a specific location on the virtual content or on a physical object. Each specific location may be associated with a corresponding function. Other visual gestures may be performed by the user looking up and down, left and right, or in any other combination of predefined eye movement. Gestures for the eyes of the user may be programmable and user defined. For example, the user may specify that looking up and down rapidly is associated with a specific user input. In other example embodiments, the AR application detects the user blinking his eyes and correlated the number of blinking to a predefined visual gesture and corresponding user input. For example, double blinking triggers a particular function or command in the AR application. Double blinking while looking at a particular location or object (physical or virtual) may trigger other predefined functions.

Another example of "visual gesture" includes "movement symbols." The movement symbols refer to when a user moves their eye gaze in a predefined sequence that is known to be meaningful to the system which then generates corresponding actions. For example, the predefined sequence includes writing the lowercase letter "e" with the user's gaze, or drawing a box, or other symbols. These movement symbols are:

in relation to themselves (e.g. they begin and end wherever the user arbitrarily begins and ends the gesture)

take place within trigger zones (e.g. a user looks into a trigger zone then performs a gesture that triggers some action), or take place in relation to the users body or another users body (e.g. a user looks at their fingertip or palm of their hand and performs a eye based movement symbol).

Another example of "visual gesture" includes feature points on bodies. The visual gesture application determines that the user is gazing at a part of the body of the user, or part of the body of a different user (either human or robotic), and performs some predefined function in the HMD. For example, the system detects that the user is looking at their fingertip (without performing any other gesture as mentioned above), or a user looks at another user's heart and can see their heart rate, or a user looks at another users head and is displayed the content that user is viewing.

The AR application may be used in combination with a wearable device such as a smart watch. For example, an eye gaze towards a pre-identified smartwatch can trigger a function (e.g., pop up a virtual menu). The combination of virtual gestures allows for a broader range of modality. For example, the user may be holding tools or is otherwise unavailable to use his hands to provide user input for a touch or gesture user interface of the HMD. With the visual gesture application, the user can naturally control the HMD by just naturally looking at a relevant location (e.g., feature points located on a virtual content, or on physical object) without having to physically move their arms or use their voice. For example, the eyes of the user of the HMD may gaze towards the noses of a virtual dragon for at least a predetermined amount of time to trigger an animation of fire breathing out of the noses of the virtual dragon rendered in the display lens of the HMD. In another example, the eyes of the user of the HMD may gaze at a physical object (e.g., a device, machine, or tool) for at least a predetermined amount of time to access virtual content associated with the physical object. The virtual content may be displayed in the display of the HMD. In other embodiments, visual and audio feedback may be provided in response to the visual gestures. Examples of visual feedback may include visual indicators In other example scenarios, an ambient environment in which the HMD is located or used may also affect a visibility of the User Interface (UI) in the HMD. For example, when a user of the HMD is located in a dark machine room, and the ambient environment has a high humidity, the performance of the UI in the HMD may be adversely affected. The combination of a dark environment and high humidity may cause the user to be uncomfortable and become agitated. Sensors in the HMD may measure the user's eye gaze to determine whether the eyes of the user are changing position rapidly (e.g., shifting back and forth) or are intently directed at a physical object for an extended period of time. The AR application may trigger different types of actions based on these ambient conditions. For example, the combination of a dark environment with rapid changes in the eye positions of the user of the HMD may cause the HMD to generate a specific command (e.g., activate head lights of the HMD, send a signal to an HVAC controlling the room to turn on the air conditioning).

Biometrics data from the user may also be used to program a visual gesture resulting in a command or user input in the HMD. For example, the visual gesture may include detecting that a user of the HMD is staring at a physical object for more than a time duration threshold in combination with a high heart rate. Therefore, when a user's eye gaze intently directed towards an object (e.g., a switch blinking red) for more than 3 seconds, and the user's heart beat exceeds a threshold heartbeat, the HMD generates a specific AR content (e.g., instructions or operation of the switch, virtual arrows telling the user to act on the switch) without the user having to use his hands to tap on a touch sensitive surface on the HMD.

The AR application may identify a visual reference on a physical object. The AR application may generate a visualization of a virtual object in a line of sight of the user so that the user perceives the virtual object as engaged with the physical object. The virtual object may be generated based on the visual reference. A rendering of the visualization of the virtual object may be based a position of the HMD relative to the visual reference. The display in the HMD may include a trigger area. The trigger area may be a predefined area in the display of the HMD that when the line of sight of the user intersects the predefined area, the AR application renders the virtual object in the display of the HMD. The AR application may also determine special features of the virtual object. A state of the feature may change when the line of sight of the user is directed towards a specific feature of the virtual object.

FIG. 1 is a network diagram illustrating a network environment 100 suitable for operating an AR application of a HMD with retractable display lenses, according to some example embodiments. The network environment 100 includes a HMD 101 and a server 110, communicatively coupled to each other via a network 108. The HMD 101 and the server 110 may each be implemented in a computer system, in whole or in part, as described below with respect to FIG. 15.

The server 110 may be part of a network-based system. For example, the network-based system may be or include a cloud-based server system that provides AR content (e.g., augmented information including 3D models of virtual objects related to physical objects captured by the HMD 101) to the HMD 101.

The HMD 101 may include a helmet that a user 102 may wear to view the AR content related to captured images of several physical objects (e.g., object A 116, object B 118) in a real world physical environment 114. In one example embodiment, the HMD 101 includes a computing device with a camera and a display (e.g., smart glasses, smart helmet, smart visor, smart face shield, smart contact lenses). The computing device may be removably mounted to the head of the user 102. In one example, the display may be a screen that displays what is captured with a camera of the HMD 101. In another example, the display of the HMD 101 may be transparent or semi-transparent surface such as in the visor or face shield of a helmet, or a display lens distinct from the visor or face shield of the helmet.

The user 102 may be a user of an AR application in the HMD 101 and at the server 110. The user 102 may be a human user (e.g., a human being), a machine user (e.g., a computer configured by a software program to interact with the HMD 101), or any suitable combination thereof (e.g., a human assisted by a machine or a machine supervised by a human). The user 102 is not part of the network environment 100, but is associated with the HMD 101. The AR application may provide the user 102 with an AR experience triggered by identified objects in the physical environment 114. The physical environment 114 may include identifiable objects such as a 2D physical object (e.g., a picture), a 3D physical object (e.g., a factory machine), a location (e.g., at the bottom floor of a factory), or any references (e.g., perceived corners of walls or furniture) in the real world physical environment 114. The AR application may include computer vision recognition to determine corners, objects, lines, and letters. The user 102 may point a camera of the HMD 101 to capture an image of the objects 116 and 118 in the physical environment 114.

In one example embodiment, the objects in the image are tracked and recognized locally in the HMD 101 using a local context recognition dataset or any other previously stored dataset of the AR application of the HMD 101. The local context recognition dataset module may include a library of virtual objects associated with real-world physical objects or references. In one example, the HMD 101 identifies feature points in an image of the devices 116, 118 to determine different planes (e.g., edges, corners, surface, dial, letters). The HMD 101 may also identify tracking data related to the devices 116, 118 (e.g., GPS location of the HMD 101, orientation, distances to devices 116, 118). If the captured image is not recognized locally at the HMD 101, the HMD 101 can download additional information (e.g., 3D model or other augmented data) corresponding to the captured image, from a database of the server 110 over the network 108. The objects may be tracked using the visual inertia navigation system described in U.S. patent application Ser. No. 14/467,391 incorporated herein by reference.

In another embodiment, the objects 116, 118 in the image are tracked and recognized remotely at the server 110 using a remote context recognition dataset or any other previously stored dataset of an AR application in the server 110. The remote context recognition dataset module may include a library of virtual objects or augmented information associated with real-world physical objects or references.

Sensors 112 may be associated with, coupled to, related to the devices 116 and 118 in the physical environment 114 to measure a location, information, reading of the devices 116 and 118. Examples of measured reading may include and but are not limited to weight, pressure, temperature, velocity, direction, position, intrinsic and extrinsic properties, acceleration, and dimensions. For example, sensors 112 may be disposed throughout a factory floor to measure movement, pressure, orientation, and temperature. The server 110 can compute readings from data generated by the sensors 112. The server 110 can generate virtual indicators such as vectors or colors based on data from sensors 112. Virtual indicators are then overlaid on top of a live image of the devices 116 and 118 to show data related to the devices 116 and 118. For example, the virtual indicators may include arrows with shapes and colors that change based on real-time data. The visualization may be provided to the HMD 101 so that the HMD 101 can render the virtual indicators in a display of the HMD 101. In another embodiment, the virtual indicators are rendered at the server 110 and streamed to the HMD 101. The HMD 101 displays the virtual indicators or visualization corresponding to a display of the physical environment 114 (e.g., data is visually perceived as displayed adjacent to the devices 116 and 118).

The sensors 112 may include other sensors used to track the location, movement, and orientation of the HMD 101 externally without having to rely on the sensors internal to the HMD 101. The sensors 112 may include optical sensors (e.g., depth-enabled 3D camera), wireless sensors (Bluetooth, Wi-Fi), GPS sensor, and audio sensor to determine the location of the user 102 wearing the HMD 101, distance of the user 102 to the tracking sensors 112 in the physical environment 114 (e.g., sensors placed in corners of a venue or a room), the orientation of the HMD 101 to track what the user 102 is looking at (e.g., direction at which the HMD 101 is pointed, HMD 101 pointed towards a player on a tennis court, HMD 101 pointed at a person in a room). In other examples, the sensors 112 include sensors for tracking infrared-based light sources, other wavelengths of invisible light to the human eye, or sound (audible or inaudible to the human ear). The sensors 112 can also include other types of sensors such as chemical recognition (e.g., smell based) sensors. Those of ordinary skill in the art will recognize that the sensors 112 can include a combination of the sensors previously described.

In another embodiment, data from the sensors 112 and internal sensors in the HMD 101 may be used for analytics data processing at the server 110 (or another server) for analysis on usage and how the user 102 is interacting with the physical environment 114. Live data from other servers may also be used in the analytics data processing. For example, the analytics data may track at what locations (e.g., points or features) on the physical or virtual object the user 102 has looked, how long the user 102 has looked at each location on the physical or virtual object, how the user 102 moved with the HMD 101 when looking at the physical or virtual object, which features of the virtual object the user 102 interacted with (e.g., such as whether a user 102 tapped on a link in the virtual object), and any suitable combination thereof. The HMD 101 receives a visualization content dataset related to the analytics data. The HMD 101 then generates a virtual object with additional or visualization features, or a new experience (e.g., new virtual content), based on the visualization content dataset. The HMD may include a voltage sensor such as an embedded EEG sensor to measure a physical and mental state of the user.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 12. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that enables communication between or among machines (e.g., server 110), databases, and devices (e.g., HMD 101, wearable device 103). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
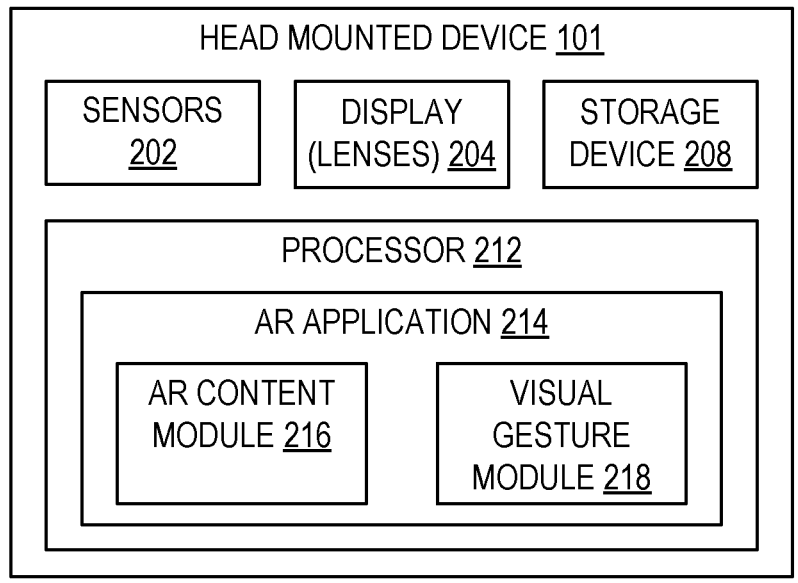
FIG. 2 is a block diagram illustrating an example embodiment of a HMD.

FIG. 2 is a block diagram illustrating modules (e.g., components) of the HMD 101, according to some example embodiments. The HMD 101 may be a helmet that includes sensors 202, a display 204, a storage device 208, and a processor 212.

The sensors 202 may include, for example, a proximity or location sensor (e.g., Near Field Communication, GPS, Bluetooth, Wi-Fi), an optical sensor(s) (e.g., camera), an orientation sensor(s) (e.g., gyroscope, or an inertial motion sensor), an audio sensor (e.g., a microphone), or any suitable combination thereof. For example, the sensors 202 may include rear facing camera(s) and front facing camera(s) disposed in the HMD 101. It is noted that the sensors 202 described herein are for illustration purposes. Sensors 202 are thus not limited to the ones described. The sensors 202 may be used to generate internal tracking data of the HMD 101 to determine what the HMD 101 is capturing or looking at in the real physical world. For example, a virtual menu may be activated when the sensors 202 indicate that the HMD 101 is oriented in a particular direction (e.g., when the user tilts his head to watch his wrist).

Figure 3:
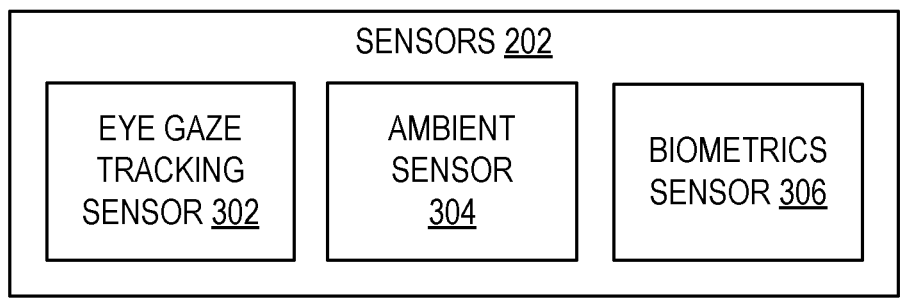
FIG. 3 is a block diagram illustrating example sensors in the HMD of FIG. 2.

FIG. 3 illustrates example embodiments of sensors 202. For example, the sensors 202 include an eye gaze tracking sensor 302 (eye gaze direction and duration), an ambient sensor (light and sound) 304, biometrics sensors 306 (pupil dimensions, heart rate, blood pressure, temperature). For example, an ambient light sensor determines an ambient luminosity by measuring the ambient light in a room. An infrared sensor pointed at an eye of the user measures the size of the pupil of the user. The IR pupil dimension sensor may sample the size of the pupil on a periodic basis or based on predefined triggered events (e.g., user walks into a different room, sudden changes in the ambient light).

Referring back to FIG. 2, the display 204 may include a display surface or lens capable of displaying AR content (e.g., images, video) generated by the processor 212. In another embodiment, the display 204 may also include a touchscreen display configured to receive a user input via a contact on the touchscreen display. In another example, the display 204 may be transparent or semi-transparent so that the user 102 can see through the display lens 204 (e.g., such as in a Head-Up Display).

The storage device 208 may store a database of identifiers of wearable devices capable of communicating with the HMD 101. In another embodiment, the database may also include visual references (e.g., images) and corresponding experiences (e.g., 3D virtual objects, interactive features of the 3D virtual objects). The database may include a primary content dataset, a contextual content dataset, and a visualization content dataset. The primary content dataset includes, for example, a first set of images and corresponding experiences (e.g., interaction with 3D virtual object models). For example, an image may be associated with one or more virtual object models. The primary content dataset may include a core set of images or the most popular images determined by the server 110. The core set of images may include a limited number of images identified by the server 110. For example, the core set of images may include the images depicting covers of the ten most viewed devices and their corresponding experiences (e.g., virtual objects that represent the ten most sensing devices in a factory floor). In another example, the server 110 may generate the first set of images based on the most popular or often scanned images received at the server 110. Thus, the primary content dataset does not depend on objects or images scanned by the HMD 101.

The contextual content dataset includes, for example, a second set of images and corresponding experiences (e.g., three-dimensional virtual object models) retrieved from the server 110. For example, images captured with the HMD 101 that are not recognized (e.g., by the server 110) in the primary content dataset are submitted to the server 110 for recognition. If the captured image is recognized by the server 110, a corresponding experience may be downloaded at the HMD 101 and stored in the contextual content dataset. Thus, the contextual content dataset relies on the context in which the HMD 101 has been used. As such, the contextual content dataset depends on objects or images scanned by the recognition module 214 of the HMD 101.

In one embodiment, the HMD 101 may communicate over the network 108 with the server 110 to retrieve a portion of a database of visual references, corresponding 3D virtual objects, and corresponding interactive features of the 3D virtual objects.

The processor 212 may include a HMD AR application 214 for generating a display of information related to the objects 116, 118 (see FIG. 1). In one example embodiment, the HMD AR application 214 includes an AR content module 216 and a visual gesture module 218. Although the AR content module 216 and a visual gesture module 218 are shown as separate modules, one or more of the modules may be combined and are each executed or implemented on one or more processors of an electronic device.

The AR content module 216 generates a visualization of information related to the objects 116, 118 when the HMD 101 captures an image of the objects 116, 118 and recognizes the objects 116, 118 or when the HMD 101 is in proximity to the objects 116, 118. For example, the HMD AR application 214 may generate a display of a holographic or virtual menu visually perceived as a layer on the objects 116, 118.

The visual gesture module 218 may determine the AR content based on predefined visual gestures associated with corresponding AR content or behavior. For example, the visual gesture module 218 may generate specific AR content based on detecting that the user is gazing at a particular location or object for more than a predetermined about of time. In another example embodiment, an eye gaze of the user may be inferred from a head position or movement of the HMD. If the user moves his/her head, the HMD moves accordingly in the same direction.

In one example embodiment, the visual gesture module 218 may thus be programmable to associated specific AR content based on the eye gaze tracking sensor data, the ambient light data from ambient sensor 304, and the biometrics sensor data from biometrics sensor 306. For example, the visual gesture module 218 may control and adjust AR content that is presented on a display 204 of the HMD 101 based on the measured ambient light (from ambient sensor 304) and the pupil dimensions of the user (from biometrics sensor 306). For example, the AR object may become dimmer if the pupil size is larger than a predefined pupil size threshold and the user has stared at a real world physical object associated with the AR object for longer than a predetermined amount of time (e.g., three seconds).

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
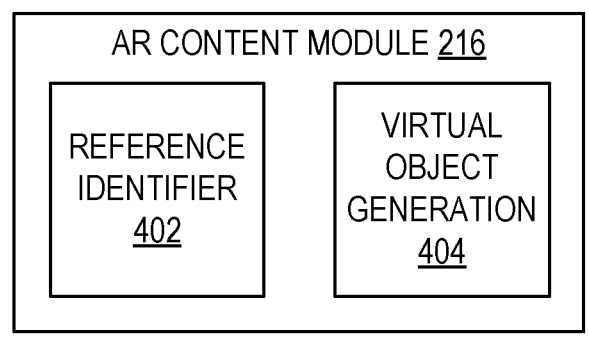
FIG. 4 is a block diagram illustrating components of an augmented reality content module of an augmented reality (AR) application in the HMD of FIG. 2, according to some example embodiments.

FIG. 4 is a block diagram illustrating components (e.g., components executing on one or more processors of an electronic device) of an AR content module of an augmented reality (AR) application in the HMD of FIG. 2, according to some example embodiments. The AR content module 216 is shown by way of example to include a reference identifier 402 and a virtual object generation module 404.

The reference identifier 402 may detect, generate, and identify identifiers such as feature points of the physical object being viewed using the viewing device 101. Based on the identifiers, the reference identifier 402 may identify a physical object. However, because machines may resemble one another on a factory floor, the reference identifier 402 may use tracking data (e.g., unique feature points, a quick response (QR) code displayed on a machine, a serial number, or the like) to further assist in identifying the unique physical object. After the reference identifier 402 determines the identifiers of the physical object, the reference identifier 402 accesses a local library of physical objects information and corresponding identifiers in the storage device 208 (or in a library stored in a remote server or on another viewing device). The reference identifier 402 compares the identifiers of the physical object to identifiers in the library in the storage device 208 and retrieves an identification of a corresponding physical object. For example, the physical object identifier module 402 identifies the QR code on the physical object 116, compares the QR code to a library of QR codes in the storage device 208, and retrieves an identification of the physical object 116. The identification of the physical object 116 may include information that uniquely identifies the physical object 116. Examples of information include a serial number, a tag number, location information or coordinate, or any unique identifier associated with the physical object 116. Other information about the physical object 116 may be included in the identification information. For example, the make, model, operating status, type of factory machine, related factory machines, factory machines connected to the physical object 116 may be included in the identification information. In another example embodiment, the reference identifier 402 displays the identification of the physical object 116 and requests a confirmation to the wearer of the HMD 101 to confirm the identification of the physical object 116.

In another example embodiment, the reference identifier 402 determines a geographic location of the user wearing the HMD 101 using sensors 202 internal to the HMD 101 or sensors 112 external to the HMD 101, or a combination thereof. The reference identifier 402 accesses a library of physical objects information and corresponding geographic locations in the storage device 208 (or in a library stored in a remote server or on another viewing device). The reference identifier 402 compares the determined geographic location of the HMD 101 with the geographic locations in the library in the storage device 208 and retrieves an identification of the corresponding physical object. For example, the reference identifier 402 identifies that the HMD 101 is located at a specific GPS coordinate, compares the specific GPS coordinate to a library of GPS coordinates in the storage device 208, and retrieves a corresponding identification of the physical object 116.

The virtual object generation module 404 retrieves virtual content based on an identification of the physical object 116 as determined by the reference identifier 402. For example, the virtual object generation module 404 retrieves or creates an association link in a library database between virtual content A and identifier A of machine/physical object A. In other example embodiments, the virtual object generation module 404 accesses and retrieves virtual content associated a geographic location of the physical object A based on a geographic location of the HMD 101.

Subsequently, the virtual object generation module 404 generates a visualization of the virtual content or renders the virtual content in the display 204. In one example embodiment, the virtual content rendering module 504 renders an animated three-dimensional object based on a three-dimensional model. The virtual content rendering module 504 renders the virtual content to be displayed in relation to a line of sight between the eyes of the wearer of the HMD 101 and the physical object being viewed by the wearer of the HMD 101 through the display 204 of the HMD 101. In another example embodiment, the virtual object generation module 404 displays the virtual content in the display 204 based on a position of the display 204 of the HMD 101 in relation to the physical object being viewed by the HMD 101. For example, if the display 204 is oriented towards the left side of the physical object when the wearer of the HMD 101 looks at the left side of the physical object, the virtual object generation module 404 renders the virtual content on the right side of the display 204 to keep the virtual content within the display 204.

Figure 5:
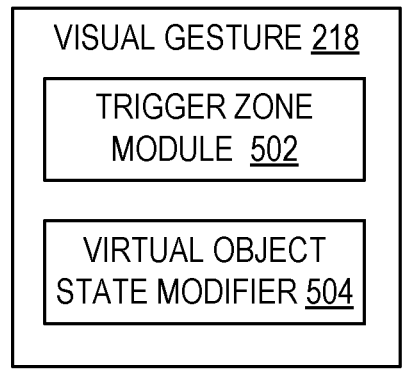
FIG. 5 is a block diagram illustrating components of a visual gesture module of an AR application in the HMD of FIG. 2, according to some example embodiments.

FIG. 5 is a block diagram illustrating components (e.g., components executing on one or more processors of an electronic device) of the visual gesture module 218 of the AR application 214 in the HMD of FIG. 2, according to some example embodiments. The virtual gesture 218 is shown by way of example to include a trigger zone module 502 and a virtual object state modifier 504.

The trigger zone module 502 defines a zone or area on a surface of the display 204 a zone or area on a surface the virtual content that are associated with a function or command of the AR application 214. For example, a central region of the display 204 may be defined as a trigger zone such that when the user looks through the central region or the line of sight of the user passes through the central region, a corresponding function is triggered in the AR application 214. In another example, a part (e.g., hands of a virtual character) on the virtual content (e.g., a virtual character) when stared at by the user may trigger a corresponding function in the AR application 214.

The virtual object state modifier 504 may change the state of the virtual content based on the line of sight of the user, or eye gaze of the user. Changes to the state of the virtual content include changes to the color, shape, size, animation, or any visual or audio changes of the virtual content. For example, the virtual content displayed in the HMD 101 may change as a result of the eye gaze direction of the user. For example, the virtual character may start to wave when the user stares at the hands of the virtual character for more than several seconds. In another example, the virtual content may disappear from the display when the eye gaze direction of the user is outside the trigger zone (e.g., a central area) in the display 204. When the line of sight of the user is back through the trigger zone in the display 204, the virtual content is rendered in the display surface 910.

In another example embodiment, the virtual object state modifier 504 may be configured to change a state of the virtual object when the virtual feature is present in the trigger zone of the display 204. For example, the virtual object state modifier 504 may activate a virtual feature corresponding to an area (e.g., where a physical feature of a physical object is located) that the user is looking at using the eye-tracking feature previously described.

In another example embodiment, the virtual object state modifier 504 may be configured to change a state of a virtual feature present in a trigger zone in the display 204 as previously described. For example, if the trigger zone is in a center area of the display 204, the virtual object state modifier 504 may change the color of an icon located in the trigger zone to indicate the user that the icon has been selected when the trigger zone module 502 detects that the user has maintained the icon in the center area of the display 204 for at least a predetermined amount of time (e.g., a few seconds). In that case, the icon may change state or otherwise be activated to initiate an action related to the icon. For example, a dialog box may be generated in the display to provide a description of the room selected by the user.

The virtual object state modifier 504 can change an appearance of an icon in the trigger zone. For example, the color or shape of the icon may change, or the icon may be replaced with another icon or another user interface such as a notification box. The virtual object state modifier 504 can trigger an action associated with an icon that has been selected by the user (e.g., by gazing at a focus area for a predetermined amount of time). For example, the virtual object state modifier 504 may generate a message notification, a dialog box, a menu, or any other action triggered by the presence of the feature in the focus area in the display 204.

In another example embodiment, the virtual object state modifier 504, the user gazes and a reticle is locked onto "rails" (e.g. like a timeline of events, in which only some events can be selected). Thus, the reticle appearing at the users gaze cannot leave the timeline unless a valid choice is made. In another example embodiment, a user is gazing at a trigger zone, and one area of the trigger zone is activated faster than the rest of the trigger zone. This helps expert users move quickly through content. For example, the focus area may include a rectangular area where an action is triggered when the user's eye gaze dwells in the middle of the trigger zone for 0.1 seconds. The same action is triggered when the user's eye gaze dwells a peripheral portion of the trigger zone for 0.75 seconds. Thus, the eye gaze dwelling time to trigger an action can vary (gradually) within the trigger zone.

In another example embodiment, the virtual object state modifier 504 may trigger an action based on the detected focal depth at which a user's eye is looking, or the depth in the world the user is looking based on convergence. The virtual object state modifier 504 may also include other operations: gradient control, user read text confirmation, dismiss and retrieve content based on eye focus and focal position, two-state confirmation and false input detection.

For example, the gradient control operation controls the movement of a cursor across a gradient, rather than executing discrete state changes (e.g., moving a cursor through a 3D cross section diagram that would reveal new inner workings of a part.

The user read text confirmation operation uses eye-tracking to confirm that user has read an important text, like a warning or end-user-license-agreement.

The dismiss and retrieve content based on eye focus uses eye-tracking (eye position, focal length, convergence) to dismiss content when it is no longer the subject of user focus. This is implemented by determining if a user is looking at virtual or physical objects close up, and then if a user looks far away or unfocused their eyes from the area where there is virtual content, automatically dismissing the virtual content from the display (also retrieving it when the user returns to where the virtual content was).

The two-stage confirmation operation (false input detection) uses eye-tracking in combination with one or more of the following: voice/audio input, biometric signals, HMD orientation sensors (potentially with a gesture), HMD hardware button, peripheral device, or bodily gesture, to allow for a two-stage confirmation that a state change is indeed intended. Other operations may be performed by combining eye-gaze tracking with hand-gestures (e.g., patterns of swiping, tapping, touching, sliding) to clarify a user's intent and reduce false input.

In another example embodiment, the virtual object state modifier 504 may be configured to generate a communication from the device 101 to another device, for example, via a wireless network. Thus, the virtual object state modifier 504 may present associated display objects on the display 202 or execute communication commands. In some example embodiments, the various modules may generate menus that are arranged in a hierarchical fashion (e.g., menus that are several levels deep) and that can be navigated based on the eye movement of the user and a duration for which the user focuses on a specific area of the display 204.

In another example, if one of more modules of the HMD 101 detects that a real object is in the line of sight of the user, and hence also seen by the user in the trigger zone (e.g., central area) of the display 204, for at least a predetermined amount of time, an action is triggered to change a state of the AR content corresponding to the real object. For example, a dialog box may pop up, or another action (e.g., playing a media file, saving an image of the real object, emailing a description or status) corresponding to the real object may be displayed on the display 204 of the HMD 101.

In another example, the visual gesture module 218 may generate a dialog box to provide a description associated with the real object, because the real object is in the line of sight of the user and within the trigger zone for at least a few seconds. As such, the user of the HMD 101 is able to generate actions related to the three-dimensional object in the device without having to tap on the screen or display of the HMD 101.

Figure 6:
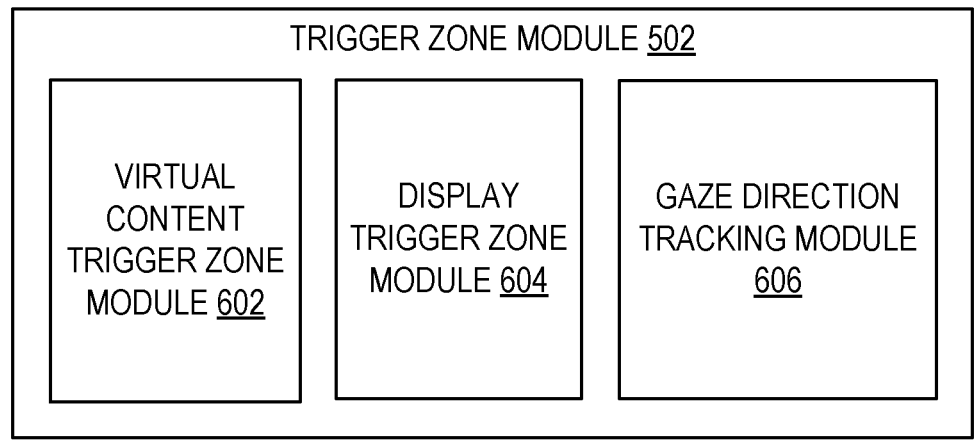
FIG. 6 is a block diagram illustrating components of a trigger zone module of the virtual gesture module of FIG. 5, according to some example embodiments.

FIG. 6 is a block diagram illustrating components (e.g., components executing on one or more processors of an electronic device) of a trigger zone module of the virtual gesture module of FIG. 5, according to some example embodiments. The trigger zone module 502 includes, by way of example, a virtual content trigger zone module 602, a display trigger zone module 604, and a gaze direction tracking module 606. The trigger zone module 502 defines surface areas or zones in the display surface of the display 204 or feature points, specific areas, or zones on a virtual content. An example of a surface zone in the display 204 may be a central area in the display 204. An example of a feature point on a virtual content may be a specific point such as the headlights of a virtual car.

The virtual content trigger zone module 602 defines trigger zones relative to the displayed virtual content. Portions or parts of a virtual content may be predefined as trigger zone. For example, the hands, eyes, hair of a virtual character may be associated with different trigger zones. Therefore, a first trigger zone may be associated with the location of the hands of the virtual character. A second trigger zone may be associated with the location of the eyes of the virtual character.

The display trigger zone module 604 defines trigger zones relative to the display 204. The display 204 may have a surface that is divided into different zones or regions. Each region may be associated with a corresponding trigger zone. For example, a first trigger zone may be associated with a central region, area, or portion of the display 204. A second trigger zone may be associated with a left region, area, or portion of the display 204.

The gaze direction tracking module 606 determines an eye gaze direction of the user based on the data from the eye gaze tracking sensor 302. For example, the gaze direction tracking module 606 determines a direction or line of sight towards which the user is looking based on the pupil position of the user. In one example, the gaze direction tracking module 606 determines whether the user is looking at virtual content or the physical object associated with the virtual content based on the line of sight of the user. In another example, the gaze direction tracking module 606 determines whether the user is looking at a feature point on the virtual content. In yet another example, the gaze direction tracking module 606 determines whether the line of sight of the user is outsize a trigger zone in the surface of the display 204.

In another example embodiment, the gaze direction tracking module 606 may be configured to detect the position and the orientation of the device relative to a visual reference on the physical object by using sensors (e.g., the sensors 202). For example, a sensor in the form of a gyroscope may determine the orientation and position of the HMD 101 in three dimensions. A camera can be used to determine the aim (e.g., along a user's line of sight) and angle of the HMD 101 relative to the visual reference on the physical object. In other words, the device relative position module 802 may determine how far or how close the HMD 101 is to the visual reference and how the HMD 101 is aimed (e.g., in a horizontal plane) to the visual reference (e.g., a point or area on a one or two-dimensional physical object being viewed).

In another example embodiment, the gaze direction tracking module 606 detects an orientation (e.g., in all three dimensions) of the device. For example, the gaze direction tracking module 606 may detect whether the HMD 101 is tilted (e.g., up and down) and positioned in at an angle relative to a horizontal level. The location of the focus area may depend on the orientation of the HMD 101. Accordingly, the device relative position module 802 may determine the relative position of the HMD 101 and the physical object (and areas of the physical object) in a three-dimensional space. Further, features of the three-dimensional virtual object may be enabled or disabled based on whether the orientation of HMD 101 (looking up, down, sideways, etc.). Example features that may be enabled include changing a shape or color of a part of a virtual content, or animating a part of the virtual content. Example features that may be disabled include turning off any audio associated with the virtual content, or hiding detailed views of a part of a virtual content.

Figure 7:
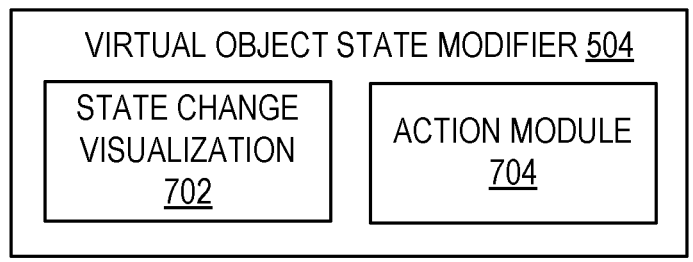
FIG. 7 is a block diagram illustrating components of a virtual object state modifier of the visual gesture module of FIG. 5, according to some example embodiments.

FIG. 7 is a block diagram illustrating components (e.g., components executing on one or more processors of an electronic device) of a virtual object state modifier of the visual gesture module of FIG. 5, according to some example embodiments. The virtual object state modifier 504 includes, by way of example, a state change visualization module 702 and an action module 704. The virtual object state modifier 504 causes virtual content to change based on the eye gaze direction of the user 102. For example, the virtual content can be rendered in the display 120 when the line of sight of the user passes through a central region in the display 102 and disappears when the line of sight of the user passes outside a central region in the display 102. In another example, the virtual content starts a particular animation when the line of sight of the user is directed towards a feature (e.g., a virtual button) of the virtual content. A predefined state of the virtual content may be associated with each feature of the virtual content. For example, when the user stares at the hair of a virtual character for a few seconds, the hairs of the virtual character start to flow. When the user stares at the eyes of the virtual character, sparkles may appear over the eyes of the virtual character.

The action module 704 determines whether to generate a command or function to change a state of the virtual content. A command or function may be triggered in different ways based on the eye gaze of the user. For example, the HMD 101 may generate a command to activate a pressure valve when the user stares at a feature of virtual content (e.g., button on a virtual valve) for more than a predetermined amount of time. In another example embodiment, the HMD 101 may generate a command to turn on a machine when the user stares at a physical switch for more than a predetermined amount of time. In other examples, the HMD 101 may generate a command to activate a machine when the eye gaze of the user changes from one position to another (e.g., staring between left and right rapidly) or the user blinks in a predefined pattern.

Figure 8A:
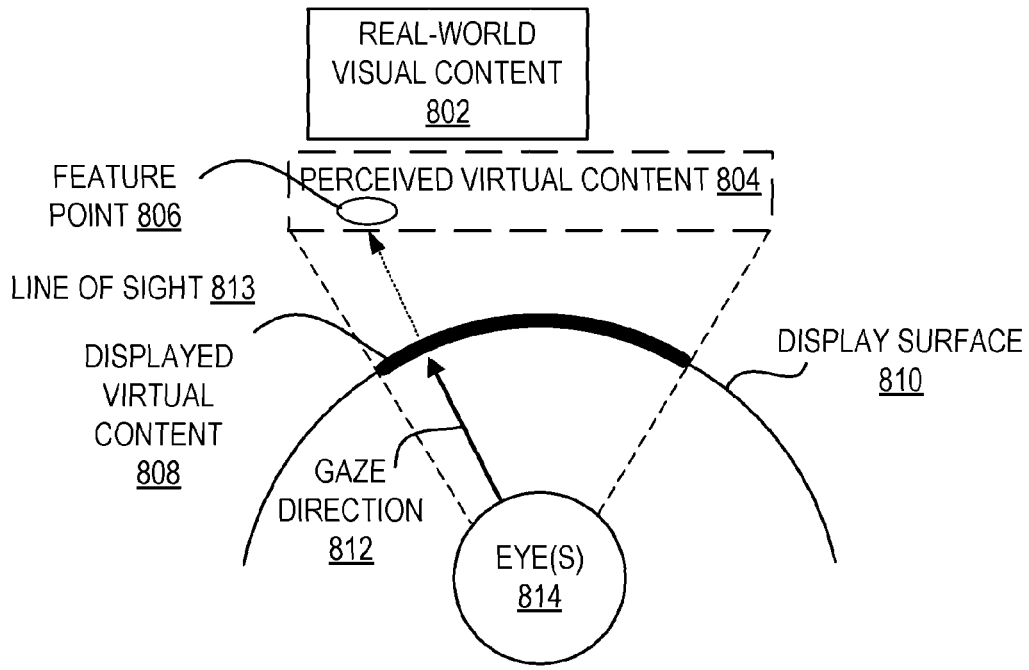
FIGS. 8A-8B illustrate one example of generating virtual content based on a change in a gaze direction of a user, in accordance with some example embodiments.
Figure 8B:
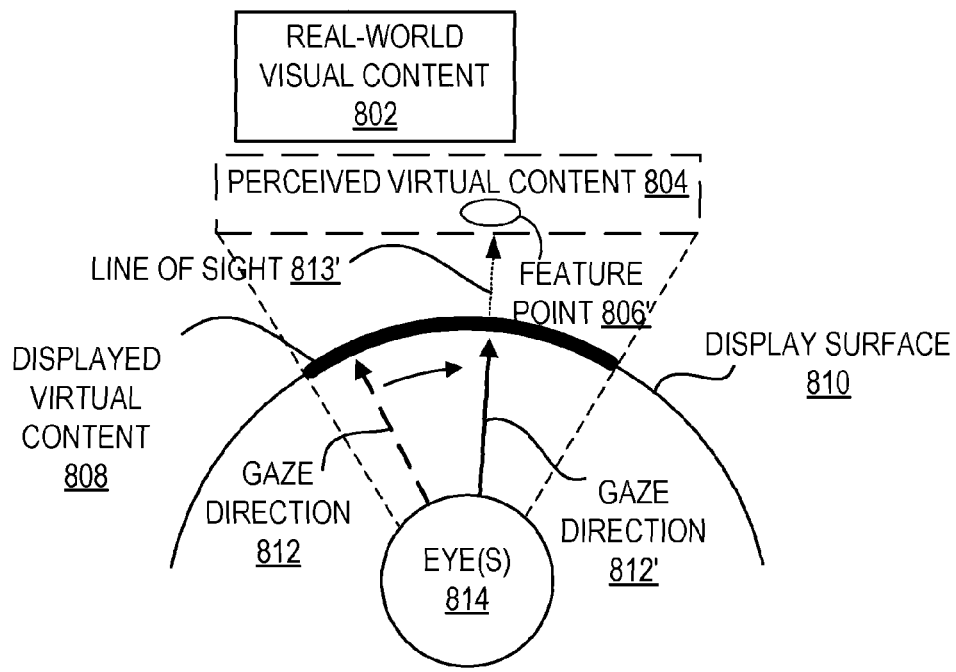

FIGS. 8A-8B illustrate one example of generating virtual content based on a change in a gaze direction of a user, in accordance with some example embodiments. FIG. 8A illustrates at least one of the user's eyes 814 looking through a display surface 810 at real-world visual content 802 along a first gaze direction 812 with a line of sight 813. Displayed virtual content 808 is caused to be displayed on display surface 810 based on the first gaze direction 812. The user's eyes 814 views the perceived virtual content 804 as visually overlaid on the real world visual content 802. The line of sight 813 passes through a portion of the display surface 810 that includes the displayed virtual content 808. As seen in FIG. 8A, the user's gaze is directed towards a feature point 806 on the perceived virtual content 804. Displayed virtual content 808 can change based on the duration of the eye gaze of the user in the gaze direction 812 towards the feature point 806. For example, the feature point 806 may represent a virtual switch of a virtual machine (the perceived virtual content 804). When the user gazes at the virtual switch of more than, for example, three seconds, the virtual switch turns on.

As seen in FIG. 8B, the user's gaze direction may shift from the first gaze direction 812 to a second gaze direction 812'. The displayed virtual content 808 remains the same. However, the user's gaze is directed towards another feature point 806' on the perceived virtual content 804. For example, the feature point 806' may be another switch of the same previous virtual machine. Displayed virtual content 808 can change based on the duration of the gaze when the gaze direction 812' is towards the feature point 806'. Accordingly, changes to the virtual content 808 may depend based on which feature points on the virtual content 808 that the eyes 814 has gazed and how long the eye gaze lasted.

Display surface 810 may be part of display screen 204 of HMD 101. In some embodiments, display surface 810 is curved, as shown in FIGS. 8A-8B. In some embodiments, display surface 810 is straight or flat (not shown). In some embodiments, display surface 810 may be one continuous display surface. In some embodiments, display surface 810 may be formed from two or more distinct display surfaces configured to work together. It is contemplated that other shapes and configurations of display surface 810 are also within the scope of the present disclosure.

Figure 9A:
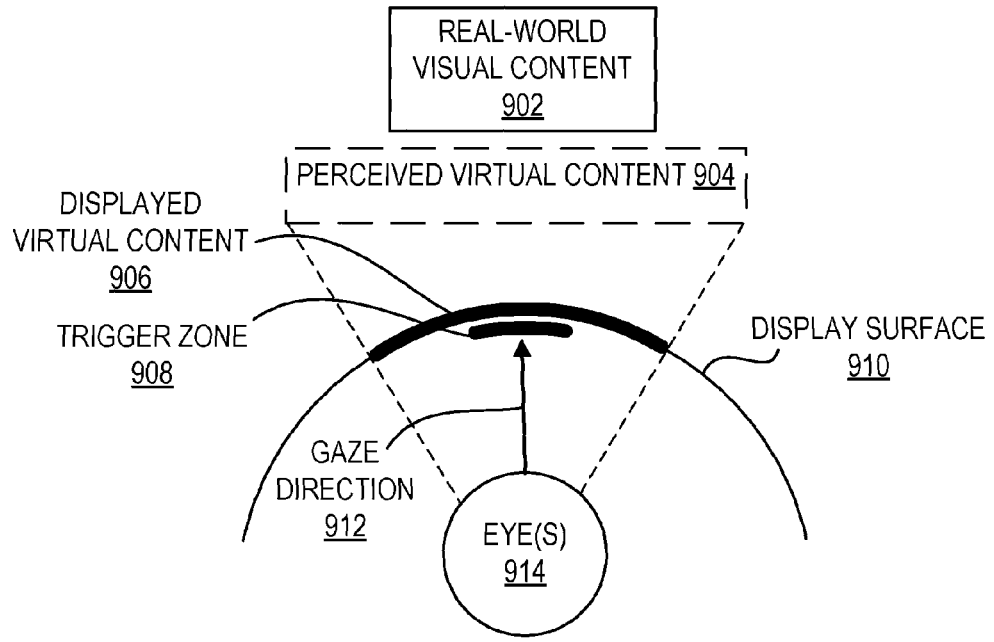
FIGS. 9A-9B illustrate another example of generating virtual content based on a change in a gaze direction of a user, in accordance with some example embodiments.
Figure 9B:
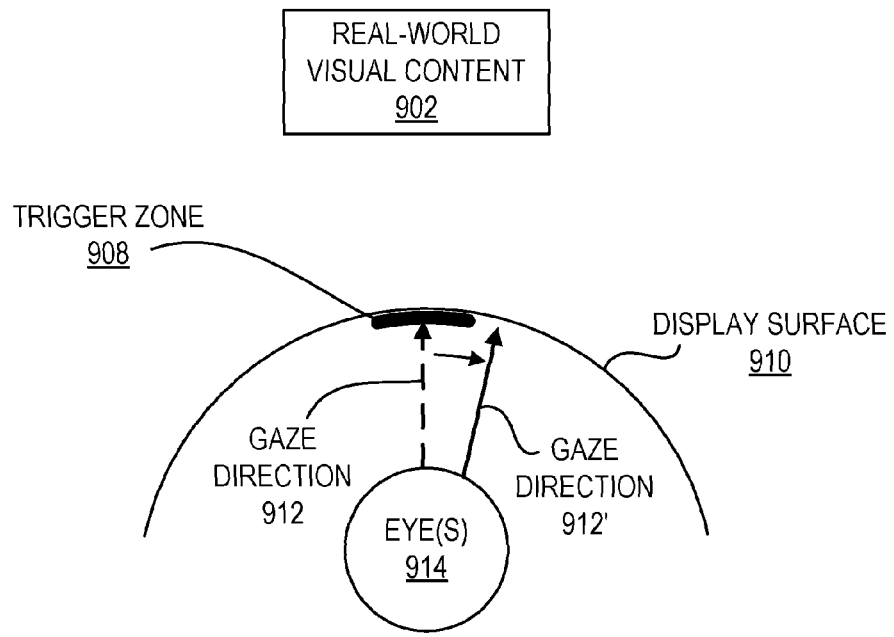

FIGS. 9A-9B illustrate another example of generating virtual content based on a change in a gaze direction of a user, in accordance with some example embodiments. FIG. 9A illustrates at least one of the user's eyes 914 looking through a display surface 910 at real-world visual content 902 along a first gaze direction 912. Displayed virtual content 906 is caused to be displayed on display surface 910. The user's eyes 914 view the perceived virtual content 904 as visually overlaid on the real world visual content 902. As seen in FIG. 9A, the user's eye gaze and line of sight are directed towards the real-world visual content 902 through a trigger zone 908 defined in the display surface 910. FIG. 9A illustrates a trigger zone located in a middle region of the display surface 910. Displayed virtual content 906 changes based on the gaze direction 912. For example, the virtual content 906 is rendered and displayed on display surface 910 when the line of sight of the eyes 914 of the user passes through the trigger zone 908. In another example embodiment, the displayed virtual content 906 is displayed in the display surface 910 when the user gazes at the real world visual content 902 through the trigger zone 908 for more than a predefined amount of time (e.g., three seconds).

As seen in FIG. 9B, the user's gaze direction may shift from the first gaze direction 912 to a second gaze direction 912'. The displayed virtual content 906 disappears from the display surface 910 in response to the second gaze direction 912' not being directed at the trigger zone 908. Therefore, the line of sight of the user does not pass through the trigger zone 908 and the HMD 101 does not render the displayed virtual content 906 on the display surface 910. FIG. 9B illustrates an example of a trigger zone 908 positioned in a central area of the display surface 910. In some embodiments, the trigger zone may be positioned or defined in other areas of the display surface 910.

Figure 10:
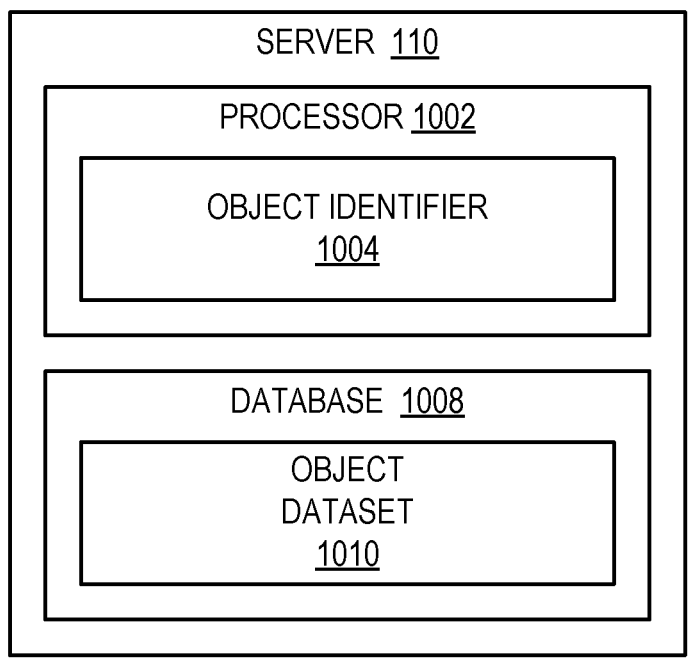
FIG. 10 is a block diagram illustrating an example embodiment of a server.

FIG. 10 is a block diagram illustrating an example embodiment of a server. The server 110 is show by way of example to include a processor 1002, and a database 1008. The server 110 may communicate with the HMD 101 via the network 108. The processor 1002 may include an object identifier 1004 and an object status identifier 1006. The object identifier 1004 may be configured to receive images captured by the camera of the HMD 101. The object identifier 1004 analyzes the images to determine feature points using computer vision. For example, the object identifier 1004 recognizes the shape of a machine or unique feature points of the machine based on plane intersections in the image. In another example, the object identifier 1004 identifies a predefined QR code associated with an identifier of an object. The object identifier then compares the QR code or the feature points to a library of QR codes or feature points in the database 1008 to determine an identifier of the object in the image and corresponding virtual content. For example, the database 1008 includes a library of feature points, corresponding physical object identifiers, and corresponding virtual content. In another example embodiment, the library also includes special feature points that activate additional virtual content when looked at for a predefined period of time. The object identifier 1004 can provide the corresponding virtual content and identify the special feature points in the virtual content that can activate additional virtual content to the HMD 101.

In another example embodiment, the object identifier 1004 determines the physical characteristics associated with the physical objects or devices identified. For example, if the device is a gauge, the physical characteristics may include functions associated with the gauge, location of the gauge, reading of the gauge, other devices connected to the gauge, safety thresholds or parameters for the gauge. Virtual content may be generated based on the object identified and a status of the object (e.g., gauge shows a normal operating status).

Figure 11A:
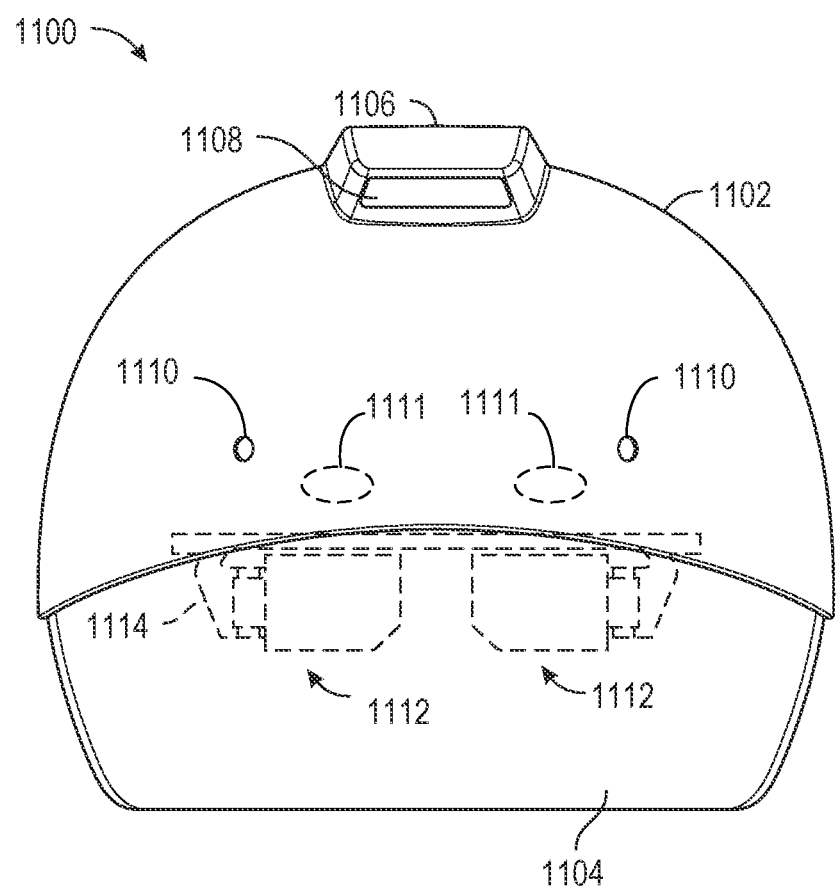
FIG. 11A is a block diagram illustrating a front view of an example of a head mounted device.
Figure 11B:
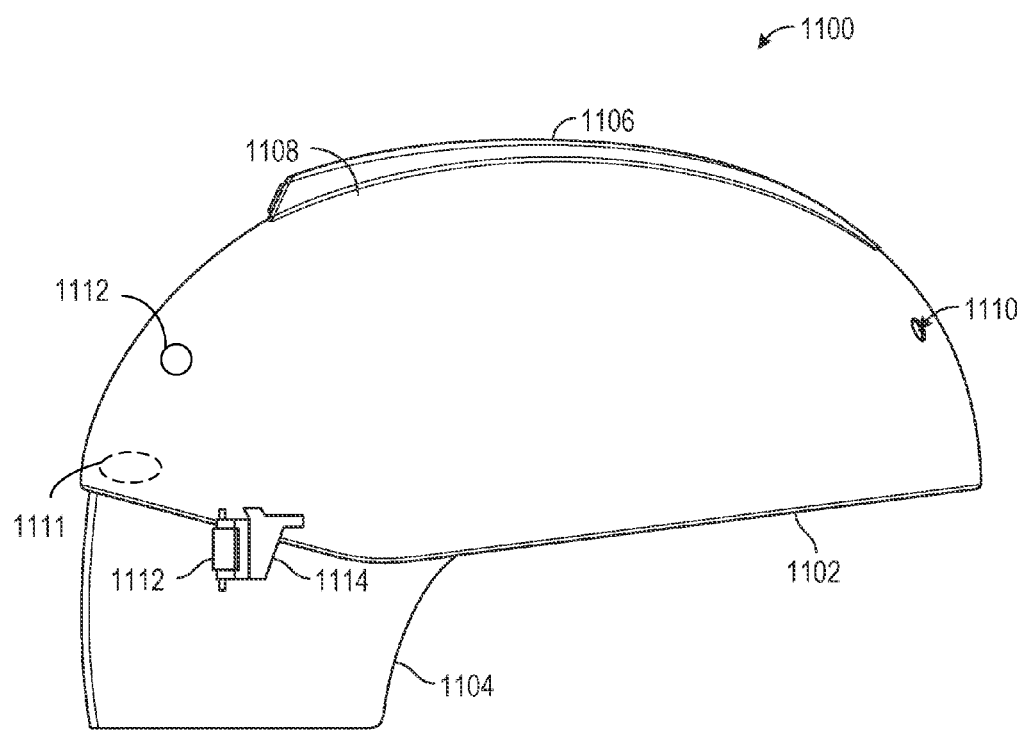
FIG. 11B is a block diagram illustrating a side view of an example of a head mounted device.

FIG. 11A is a block diagram illustrating a front view of an example of a head mounted device. FIG. 11B is a block diagram illustrating a side view of an example of a head mounted device.

The HMD 1100 includes a helmet 1102 and a visor 1104 that is attached to the helmet 1102. The helmet 1102 may include sensors (e.g., optical, proximity, audio, etc. sensors) 1108 and 1110 disposed at the front, back, and a top section 1106 of the helmet 1102. Display lenses 1112 are mounted on a lens frame 1114. The display lenses 1112 include a transparent display. In use, images are displayed by the transparent display but still allow the user to view physical objects through the lenses 1112. The HMD 1100 also includes two eye gaze tracking sensors 1111 mounted to a housing of the helmet 1102. Each eye gaze tracking sensor 1111 monitors the pupil of a corresponding eye of a wearer or user of the HMD 1100. For example, each eye gaze tracking sensor 1111 may track a position of the pupil of the eye of the wearer of the helmet 1102 as the user moves his or her eyes. Accordingly, in an example embodiment, the eye gaze tracking sensors 1111, in conjunction with associated electronic tracking modules (e.g., provided in the HMD AR Application 214) can determine a direction at which the user is staring. The eye gaze tracking sensor 1111 may also determine how long (a time duration) the user is staring at a particular point or in a particular line of sight. The eye gaze tracking sensor 1111 may also determine whether the user blinks and how many times the user blinks, a duration of each blink, or the like. Programmable operations of the HMD 1100 may be defined based on eye-related activities sensed by the eye gaze tracking sensors 1111, for example, activities such as duration that an eye stares at an object (physical or virtual) and/or the number of blinks.

Figure 12:
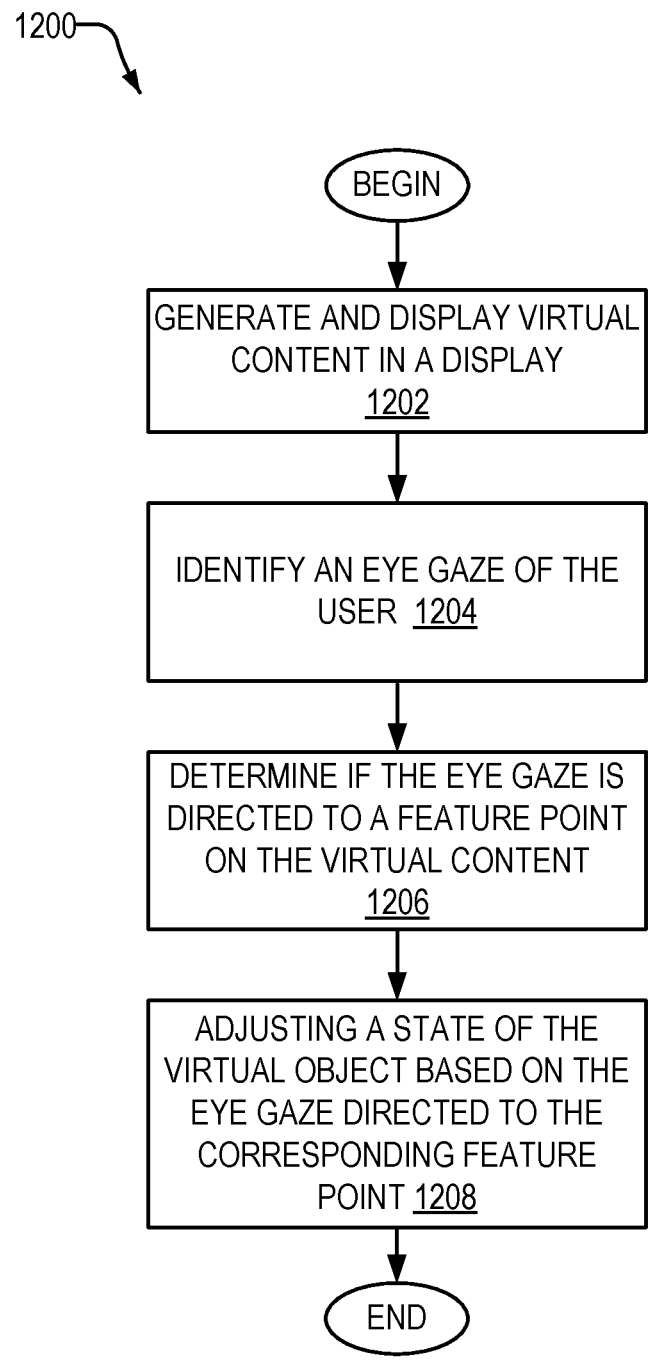
FIG. 12 is a flowchart illustrating an example operation of the AR application of the HMD in performing a method to enable a visual gesture on the HMD, according to some example embodiments.

FIG. 12 is a flowchart illustrating an example operation 1200 of the AR application of the HMD in performing a method to enable a visual gesture on the HMD, according to some example embodiments. At operation 1202, the HMD 101 generates and displays virtual content in the display 204 of the HMD 101. In one example embodiment, operation 1202 may be implemented using the virtual object generation module 404 to generate and render a three dimensional model of a virtual object in the display 204 such that the user of the HMD 101 perceives the virtual object as an overlay to a view of the real world physical objects.

The HMD 101 identifies an eye gaze of the user in operation 1204. For example, the HMD 101 determines a gaze direction and line of sight of the eyes of the user relative to the display 204 of the HMD 101. In one example embodiment, the gaze direction tracking module 606 may be used to implement operation 1204.

At operation 1206, the visual content trigger zone module 602 determines whether the user has directed his/her eye gaze towards a specific part (also referred to as feature point) of the virtual object or physical object. For example, the visual content trigger zone module 602 determines that the line of sight of the user indicates that the user is looking at a switch of a virtual radio. The HMD 101 may render and display a three dimensional model of the virtual radio in the display 204 based on the AR content module 216 recognizing a reference identifier 402.

The HMD 101 adjusts the state of the virtual object displayed in the display 204 based detecting that the eye gaze of the user of the HMD 101 is directed to a corresponding feature point in the virtual object. Examples of state changes to the virtual object may include changing an appearance of the virtual object or generating virtual dialog boxes. For example, when the user stares at a virtual switch of the virtual radio for more than three seconds, the virtual radio turns on and displays the station being tuned to. In another example, when the user stares at the head of a virtual dragon for longer than two seconds, the HMD 101 displays the virtual dragon breathing fire. Changes to the state of the virtual object may be implemented using the virtual object state modifier 504. For example, the state change visualization module 702 may changes the color of a virtual dragon being displayed in the display 204 of the HMD 101. In another example, the action module 704 may trigger a physical action related to the feature point being stared at. For example, if the user stares at the virtual switch of a virtual machine for longer than two seconds, the HMD 101 may send a command to activate a physical machine associated with the virtual machine.

Figure 13:
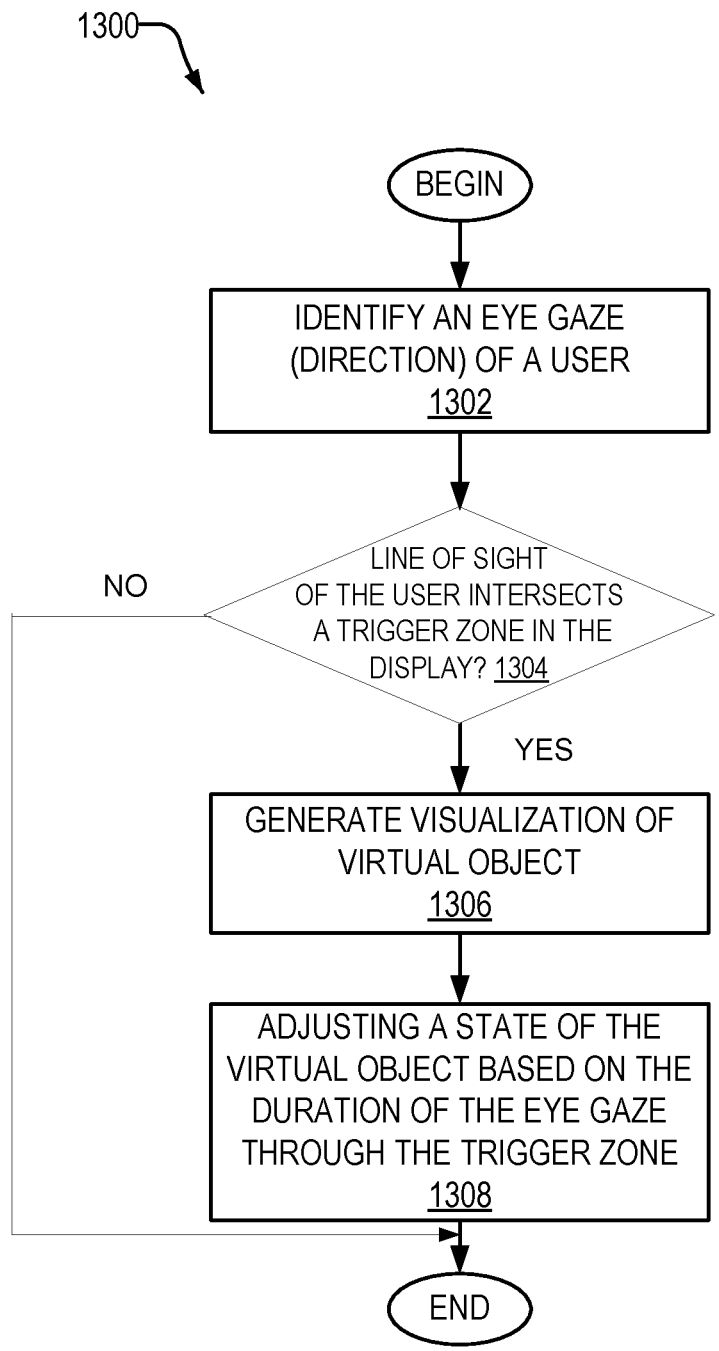
FIG. 13 is a flowchart illustrating another example operation of the AR application of the HMD in performing a method to enable a visual gesture on the HMD, according to some example embodiments.

FIG. 13 is a flowchart illustrating another example operation 1300 of the AR application of the HMD in performing a method to enable a visual gesture on the HMD, according to some example embodiments. At operation 1302, the HMD 101 identifies an eye gaze of the user. For example, the HMD 101 determines a gaze direction and line of sight of the eyes of the user relative to the display 204 of the HMD 101. In one example embodiment, the gaze direction tracking module 606 may be used to implement operation 1302.

Subsequently, the HMD 101 determines whether the light of sight of the user intersects or passes through a trigger zone in the display 202 at operation 1304. The trigger zone may include a portion of the display 202 (e.g., central portion, upper portion, lower portion, left portion, right portion). The trigger zones may be predefined or preset for the HMD 101. The trigger zone may be defined using the trigger zone module 502. Therefore, when the HMD 101 detects that the line of sight of the user passes through the trigger zone, the HMD 101 generates a visualization of the virtual object at operation 1306.

In another example embodiment, the state of the virtual object may be based on the duration of the eye gaze through the trigger zone as shown in operation 1308. For example, the virtual object changes (e.g., change color, shape, or start or stop an animation) when the user stares through the trigger zone in the display 204 for more than a predetermined period of time (e.g., 2 seconds). Operation 1308 may be implemented using the state change visualization module 702 and the action module 704.

Figure 14:
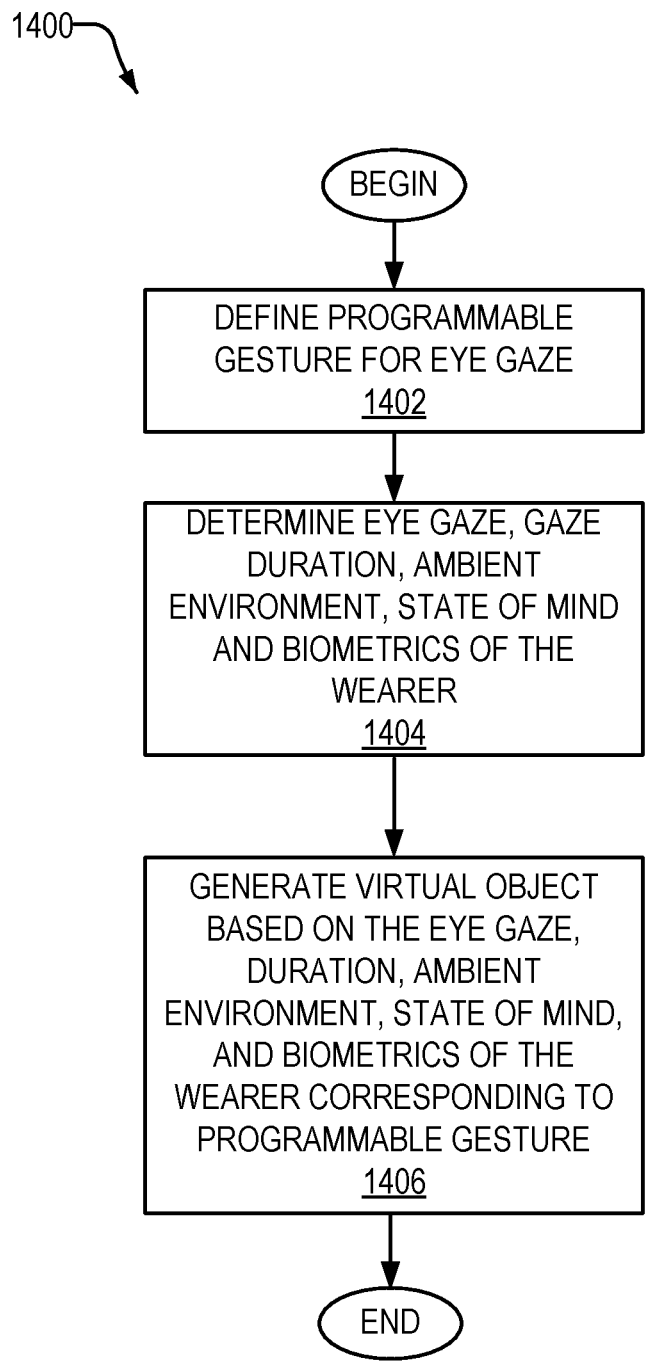
FIG. 14 is a flowchart illustrating another example operation of the AR application of the HMD in performing a method to enable a visual gesture on the HMD, according to some example embodiments.

FIG. 14 is a flowchart illustrating another example operation 1400 of the AR application of the HMD in performing a method to enable a visual gesture on the HMD, according to some example embodiments. At operation 1402, the user of the HMD 101 may define programmable gesture based on an eye gaze, a line of sight, and duration of the eye gaze of the wearer of the HMD 101. The visual gesture may be defined using the trigger zone module 502 to define feature points of a virtual content that trigger an action, or to define trigger zone. The feature points and trigger zone may be associated with corresponding visual gestures. For example, staring at a first predefined feature point of a virtual object for more than two seconds triggers a first function in the HMD 101. Staring at a second predefine feature point of a virtual object for more than five seconds triggers a second function in the HMD 101. Staring at a physical object through the trigger zone may trigger a third function in the HMD 101. The virtual gesture 218 may be used to program different visual gestures.

At operation 1404, the HMD 101 determines an eye gaze direction, an eye gaze duration, ambient environment data, a state of mind and other biometrics from the wearer of the HMD 101. Sensor 202 may be used to implement operation 1404. For example, the eye gaze direction may be determined using the eye gaze tracking sensor 302. Ambient environment data may be determined or calculated using the ambient sensor 304. For example, the ambient environment detects a humidity level exceeding a predefined safe humidity level for a particular work environment. The state of mind or other biometrics data may be determined using biometrics sensor 306.

The HMD 101 determines a virtual gesture based on the eye gaze direction and duration, ambient environment information, a state of mind and biometrics data of the wearer of the HMD 101 as shown in operation 1406. Once the virtual gesture is determined, the HMD 101 displays the virtual object corresponding to the virtual gesture or operates on the virtual object based on the virtual gesture.

Figure 15:
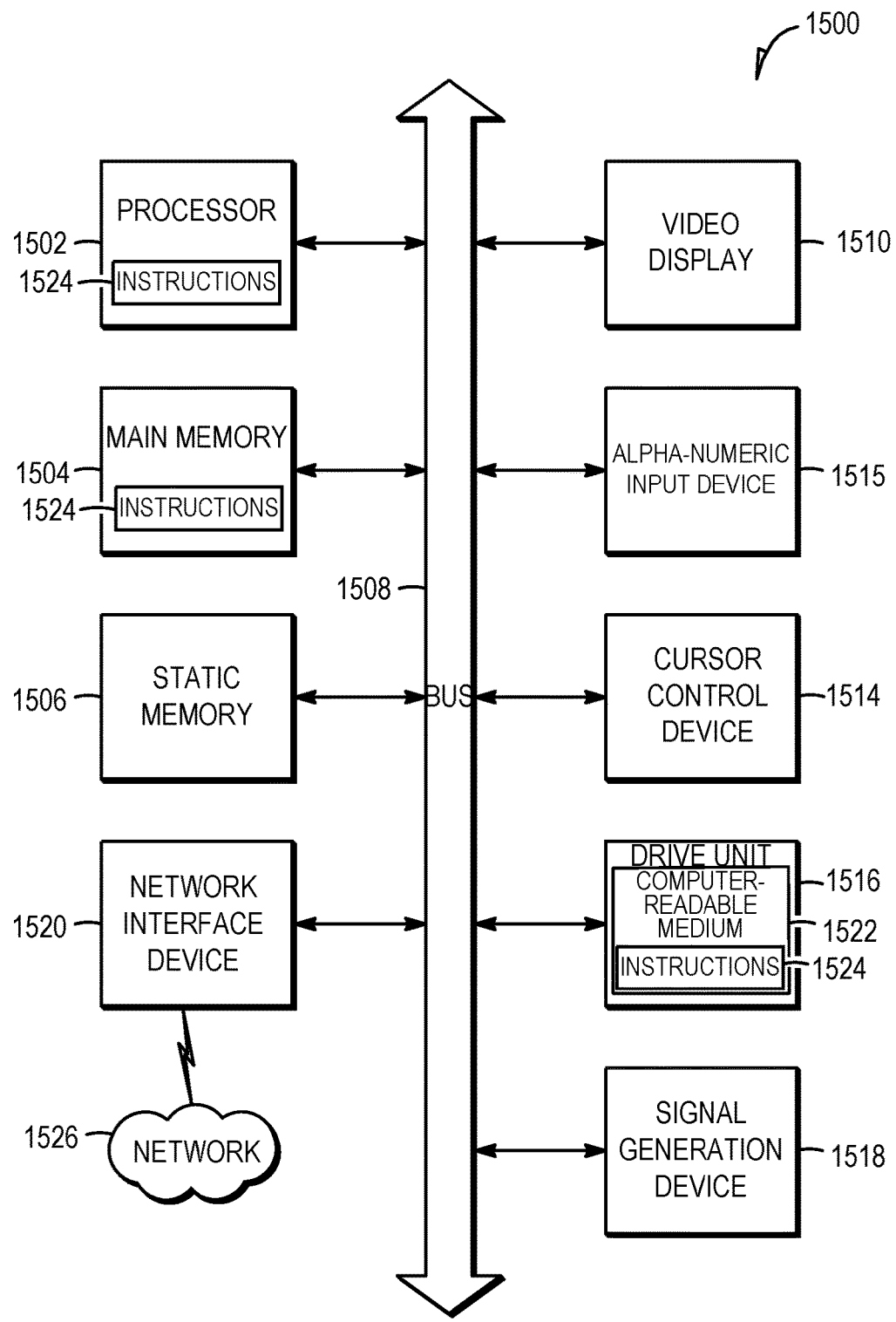
FIG. 15 is a block diagram illustrating components of a machine, according to some example embodiments, able to read instructions from a machine-readable medium and perform any one or more of the methodologies discussed herein.

FIG. 15 is a block diagram illustrating components of a machine 1500, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 15 shows a diagrammatic representation of the machine 1500 in the example form of a computer system and within which instructions 1524 (e.g., software, a program, an application, an applet, an app, or other executable code) for causing the machine 1500 to perform any one or more of the methodologies discussed herein may be executed, in whole or in part. In alternative embodiments, the machine 1500 operates as a standalone device or may be connected (e.g., networked) to other machines. In a networked deployment, the machine 1500 may operate in the capacity of a server machine or a client machine in a server-client network environment, or as a peer machine in a distributed (e.g., peer-to-peer) network environment. The machine 1500 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1524, sequentially or otherwise, that specify actions to be taken by that machine. Further, while only a single machine is illustrated, the term "machine" shall also be taken to include a collection of machines that individually or jointly execute the instructions 1524 to perform all or part of any one or more of the methodologies discussed herein.

The machine 1500 includes a processor 1502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1504, and a static memory 1506, which are configured to communicate with each other via a bus 1508. The machine 1500 may further include a graphics display 1510 (e.g., a plasma display panel (PDP), a light emitting diode (LED) display, a liquid crystal display (LCD), a projector, or a cathode ray tube (CRT)). The machine 1500 may also include an alphanumeric input device 1512 (e.g., a keyboard), a cursor control device 1514 (e.g., a mouse, a touchpad, a trackball, a joystick, a motion sensor, or other pointing instrument), a storage unit 1516, a signal generation device 1518 (e.g., a speaker), and a network interface device 1520.

The storage unit 1516 includes a machine-readable medium 1522 on which is stored the instructions 1524 embodying any one or more of the methodologies or functions described herein. The instructions 1524 may also reside, completely or at least partially, within the main memory 1504, within the processor 1502 (e.g., within the processor's cache memory), or both, during execution thereof by the machine 1500. Accordingly, the main memory 1504 and the processor 1502 may be considered as machine-readable media. The instructions 1524 may be transmitted or received over a network 1526 (e.g., network 190) via the network interface device 1520.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1522 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 1500), such that the instructions, when executed by one or more processors of the machine (e.g., processor 1502), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A head mounted display device comprising:
    a transparent display operatively positioned to present virtual content to a user wearing the head mounted display device while allowing the user to view physical objects through the transparent display;
    one or more eye gaze sensors configured to track at least a first pupil of the user to determine an eye gaze of the user, wherein the eye gaze of the user indicates a location on the transparent display in a line of sign of the user;
    one or more computer processors; and
    a memory storing instructions that, when executed by the one or computer processors, cause the head mounted display device to:
        monitor the eye gaze of the user wearing the head mounted display device;
        determine, based on monitoring the eye gaze of the user, that a duration of time that the line of sight of the user is within a predefined trigger zone of the transparent display exceeds a threshold duration for the predefined trigger zone, wherein the predefined trigger zone corresponds to a first physical object visible to the user through the predefined trigger zone of the head mounted display; and
        in response to determining that the duration of time that the line of sight of the user is within the predefined trigger zone of the transparent display exceeds the threshold duration, cause a display of a virtual object in the predefined trigger zone of the transparent display.

2. The head mounted display device of claim 1, wherein the one or more eye gaze sensors are configured to identify a direction and a duration of the eye gaze of the user.

3. The head mounted display device of claim 2, wherein the instructions further cause the head mounted display device to change a state of the virtual object based on a change in the direction and duration of the eye gaze of the user.

4. The head mounted display device of claim 2, wherein the predefined trigger zone includes a plurality of gradient zones, each gradient zones associated with a corresponding predefined trigger duration.

5. The head mounted display device of claim 2, wherein the instructions further cause the head mounted display device to:
    identify a spatial and temporal pattern of the eye gaze of the user;
    identify a predefined spatial and temporal pattern; and
    display the virtual object in the display based on the spatial and temporal pattern of the eye gaze of the user matching the predefined spatial and temporal pattern.

6. The head mounted display device of claim 2, wherein the instructions further cause the head mounted display device to:
    identify a focal depth of the eye gaze of the user;
    identify a predefined focal depth range; and
    display the virtual object in the transparent display based on the focal depth of the eye gaze of the user being with the predefined focal depth range.

7. The head mounted display device of claim 2, further comprising:
    a voltage sensor connected to a skin of the user, the voltage sensor configured to identify a physical and mental state of the user, wherein the instructions further cause the head mounted display device to:
    identify a predefined physical and mental state corresponding to a second virtual object; and
    display the second virtual object in the transparent display based on a combination of the physical and mental state of the user corresponding to the predefined physical and mental state and the eye gaze of the user intersecting the predefined trigger zone.

8. The head mounted display device of claim 2, wherein the instructions further cause the head mounted display device to:
identify that the eye gaze of the user is within a predefined distance threshold of the predefined trigger zone; and
display a visual indicator being pulled towards the predefined trigger zone.

9. The head mounted display device of claim 2, wherein the instructions further cause the head mounted display device to:
identify a predefined trigger point associated with a body part of the user; and
display a second virtual object in the transparent display based on a first eye gaze of the user directed at the body part of the user followed by a second eye gaze of the user directed at the predefined trigger zone associated with the body part.

10. A computer-implemented method comprising:
monitoring, by a head mounted display device, an eye gaze of a user wearing the head mounted display device, the head mounted display device including a transparent display operatively positioned to present virtual content to the user while allowing the user to view physical objects through the transparent display, the head mounted display including one or more eye gaze sensors configured to track at least a first pupil of the user to determine the eye gaze of the user, wherein the eye gaze of the user indicates a location on the transparent display in a line of sight of the user;
determining, based on monitoring the eye gaze of the user, that a duration of time that the line of sight of the user is within a predefined trigger zone of the transparent display exceeds a threshold duration for the predefined trigger zone, wherein the predefined trigger zone corresponds to a first physical object visible to the user through the predefined trigger zone of the head mounted display; and
in response to determining that the duration of time that the line of sight of the user is within the predefined trigger zone of the transparent display exceeds the threshold duration, causing a display of a virtual object in the predefined trigger zone of the transparent display.

11. The computer-implemented method of claim 10, further comprising:
identifying a direction and a duration of the eye gaze of the user.

12. The computer-implemented method of claim 11, further comprising:
changing a state of the virtual object based on a change in the direction and duration of the eye gaze of the user.

13. The computer-implemented method of claim 11, wherein the predefined trigger zone includes a plurality of gradient zones, each gradient zones associated with a corresponding predefined trigger duration.

14. The computer-implemented method of claim 11, further comprising:
identifying a spatial and temporal pattern of the eye gaze of the user;
identifying a predefined spatial and temporal pattern; and
displaying the virtual object in the display based on the spatial and temporal pattern of the eye gaze of the user matching the predefined spatial and temporal pattern.

15. The computer-implemented method of claim 11, further comprising:
identifying a focal depth of the eye gaze of the user;
identifying a predefined focal depth range; and
displaying the virtual object in the transparent display based on the focal depth of the eye gaze of the user being with the predefined focal depth range.

16. The computer-implemented method of claim 11, further comprising:
identifying a physical and mental state of the user using a voltage sensor connected to a skin of the user;
identifying a predefined physical and mental state corresponding to a second virtual object; and
displaying the second virtual object in the transparent display based on a combination of the physical and mental state of the user corresponding to the predefined physical and mental state and the eye gaze of the user intersecting the predefined trigger zone.

17. The computer-implemented method of claim 11, further comprising:
identifying a predefined trigger point associated with a body part of the user; and
displaying a second virtual object in the transparent display based on a first eye gaze of the user directed at the body part of the user followed by a second eye gaze of the user directed at the predefined trigger zone associated with the body part.

18. A non-transitory machine-readable medium comprising instructions that, when executed by one or more processors of a head mounted display device, cause the head mounted display device to perform operations comprising:
monitoring an eye gaze of a user wearing the head mounted display device, the head mounted display device including a transparent display operatively positioned to present virtual content to the user while allowing the user to view physical objects through the transparent display, the head mounted display including one or more eye gaze sensors configured to track at least a first pupil of the user to determine the eye gaze of the user, wherein the eye gaze of the user indicates a location on the transparent display in a line of sight of the user;
determining, based on monitoring the eye gaze of the user, that a duration of time that the line of sight of the user is within a predefined trigger zone of the transparent display exceeds a threshold duration for the predefined trigger zone, wherein the predefined trigger zone corresponds to a first physical object visible to the user through the predefined trigger zone of the head mounted display; and
in response to determining that the duration of time that the line of sight of the user is within the predefined trigger zone of the transparent display exceeds the threshold duration, causing a display of a virtual object in the predefined trigger zone of the transparent display.

* * * * *